United States Patent [19]

Mendelsohn et al.

[11] Patent Number: 5,313,628
[45] Date of Patent: May 17, 1994

[54] COMPONENT REPLACEMENT CONTROL FOR FAULT-TOLERANT DATA PROCESSING SYSTEM

[75] Inventors: Noah R. Mendelsohn, Arlington; James Perchik, Cambridge; Thomas R. Hancock, Somerville, all of Mass.

[73] Assignee: International Business Machines Corporation, Armonk, N.Y.

[21] Appl. No.: 816,350

[22] Filed: Dec. 30, 1991

[51] Int. Cl.$^5$ .......................................... G06F 11/00
[52] U.S. Cl. .................................. 395/575; 371/9.1; 371/11.1
[58] Field of Search .............. 371/81, 9.1, 68.3, 10.1, 371/11.1, 11.3, 16.5, 5.1, 5.5, 4, 36; 364/280.2, 281.9, 269.2, 268.4

[56] References Cited

U.S. PATENT DOCUMENTS

| | | | |
|---|---|---|---|
| 3,665,418 | 5/1972 | Bouricius et al. | 340/172.5 |
| 3,758,761 | 9/1973 | Henrion | 340/172.5 |
| 3,805,039 | 4/1974 | Stiffler | 235/153 AE |
| 4,412,281 | 10/1983 | Works | 364/200 |
| 4,442,502 | 4/1984 | Friend et al. | 364/900 |
| 4,633,467 | 12/1986 | Abel et al. | 371/16 |
| 4,814,979 | 3/1989 | Neches | 364/200 |
| 4,815,076 | 3/1989 | Denny et al. | 371/11 |
| 4,847,837 | 7/1989 | Morales et al. | 371/8 |
| 4,866,712 | 9/1989 | Chao | 371/5.1 |
| 4,891,810 | 1/1990 | de Corlieu et al. | 371/9.1 |
| 4,920,497 | 4/1990 | Upadhyaya et al. | 364/491 |
| 4,965,717 | 10/1990 | Cutts, Jr. et al. | 371/36 |
| 5,121,500 | 6/1992 | Arlington et al. | 364/200 |

OTHER PUBLICATIONS

Kazvo Sugihara et al. 'On Fault Tolerant of Reconfigurable Arrays Using Spare Processors' 1991 IEEE pp. 10–15.

Johnson et al. 'Increasing System Reliability' IEEE pp. 12A1-2:1–12A1-2:5.

Hodges et al. 'A Fault-Tolerant Multiprocessor Designs for Real-Time Control' Computer Design Dec. 1973 pp. 75–81.

Primary Examiner—Robert W. Beausoliel, Jr.
Assistant Examiner—Albert Decady
Attorney, Agent, or Firm—Perman & Green

[57] ABSTRACT

Apparatus is described for component replacement control in a data processing system, with each component being assigned a label that includes a component identifier and a replacement generation value. The apparatus includes a plurality of tables for redundantly storing replacement generation values for each component. The tables that store the replacement generation values are then updated to indicate the incremented replacement generation value for the new component. Circuitry then increments the replacement generation value assigned to a component identity that is replaced by a new component. The circuitry modifies the new component's label to indicate the incremented replacement generation value. When the system is subsequently started, the replacement generation values in each component's label are compared with the replacement generation values in the tables and wherever a match is not found, the component is rejected.

15 Claims, 4 Drawing Sheets

COMPONENT REPLACEMENT CONTROL FOR FAULT-TOLERANT DATA PROCESSING SYSTEM

FIELD OF THE INVENTION

This invention relates to fault-tolerant systems and, more particularly, to a fault-tolerant data processing system with means to assure that a replacement component is properly configured to replace a failed component.

BACKGROUND OF THE INVENTION

Fault-tolerant systems have been produced for a variety of applications. Some systems achieve fault tolerance by including redundant computing systems, each of which serves as a standby replacement for some or all of the others. So long as the replacement component is identical to the component being replaced, few problems arise in the handling of such replacements. When the component being replaced has been altered during the operation of the data processing system, the replacement component must be similarly altered. If the original failed component or an earlier replacement is reintroduced into the system, a system malfunction will result. This problem is especially severe in data processing systems with large numbers of inherently similar components that are subject to change in distinct and persistent ways as the data processing system operates. For instance, in large parallel computing systems, nodes are employed that include microprocessors with individual disk drive memories. During operation of the parallel processing system, the disks in such nodes store data and thus become "personalized" in accordance with particular system control functions. If such a node fails, is replaced, and the replacement itself fails and is replaced, only the latest replacement has an up-to-date "personality". A means is required to ensure that none of the older versions are permitted to rejoin the system.

The prior art discloses a number of methods and systems for enabling failed part replacements. In U.S. Pat. No. 3,665,418 to Bouricius et al., a fault-tolerant computer system employing stand-by redundancy is described. In the event of a failure of a subassembly, a switching system enables a routing around the failed subsystem. In U.S. Pat. No. 4,633,467 to Abel et al., a system is described for enabling identification of a failed unit when the unit is "buried" within other units and is difficult to monitor. A probability listing is created that enables the fault to be assigned to the unit that is most probably inoperable. In U.S. Pat. No. 4,814,979 to Neches, shut down of one or more processors in a multiprocessor system is immediately communicated throughout the system so that an interrupt sequence can be initiated.

In U.S. Pat. No. 4,412,281 to Works, a bus system is used, to which replacement parts are connected. By the expedient of changing an address on the bus, a replacement part can be substituted for a malfunctioning part and enables the continuation of system operations. A similar reassignment method is taught in U.S. Pat. No. 4,442,502 to Friend et al, wherein redundant devices are substituted for malfunctioning devices by the switching of assigned identities.

In U.S. Pat. No. 4,847,837 to Morales et al., a local area network is disclosed which can identify the existence of a fault or error condition in the network, isolate it and alert service personnel to the existence and location of the problem. In U.S. Pat. No. 4,815,076 to Denney et al., a system reconfiguration technique is described that provides several alternatives for recovering from single or multiple component failures. The system locates and tests one or more configurations of a failure scenario and presents possible reconfiguration scenarios in order of preference. US. Pat. No. 4,891,810 to deCorlieu et al., describes a reconfigurable computing system that includes redundant elements. Reconfiguration of the system involves substitution of the redundant element for a malfunctioning element. However, if the system is in a critical computing operation, reconfiguration is postponed to a later time. Chao in U.S. Pat. No. 4,866,712, describes a method and apparatus for fault recovery which includes an error table and action table. When an error count exceeds a threshold, corrective action is initiated in accordance with the aforesaid tables.

U.S. Pat. No. 3,805,039 to Stiffler and U.S. Pat. No. 4,920,497 to Upadhyaya et al. both teach redundant systems wherein inoperable elements are determined and the systems then maps its operations so as to avoid such inoperable elements Stiffler also teaches the use of spare sub-elements as substitutes for the mapped-around elements In U.S. Pat. No. 3,758,761 to Henrion, an electronic system "on a slice" is described wherein substitute redundant subsystems are provided on the slice and are enabled for substitution for malfunctioning subsystems by an external control circuit.

A consistent feature of the prior art is that the redundant replacement component is assumed to be a one-for-one replacement of a malfunctioned component. So long as the malfunctioned component is not personalized during its operation, this is a valid assumption. However, if personalization occurs during operations, a method and apparatus must be provided to enable the system to assure that any replacement is similarly personalized and that no improperly personalized replacement is used as a substitute.

Another problem that occurs with fault-tolerant systems is that a personalized component may malfunction on a transient basis, be replaced by a redundant unit, and at some later time, be reactivated after the transient malfunction has ended. Under such circumstances, the system must have a means for determining that an already-replaced component is attempting to reassert itself into the system. The system must also ensure that no other component has already been activated as a replacement. Under such circumstances, the system should normally ignore such a reassertion action, as the personalization state of the component attempting reinstatement in the system is probably not as up-to-date as the component that replaced it.

Accordingly, it is an object of this invention to provide a data processing system with means for determining a level of personalization of each replaceable component in the system.

It is another object of this invention to provide a fault-tolerant data processing system wherein component replacement is controlled so as to prevent reactivation of a previously failed component that has already been replaced.

It is still another object of this invention to provide a fault-tolerant data processing system which assures that any replacement component is intended for the particular system in which it is being inserted.

SUMMARY OF THE INVENTION

Apparatus is described for component replacement control in a data processing system, with each component being assigned a label (typically stored with the component) that includes a component identifier and a replacement generation value. The term "replacement generation value" is an integer that indicates the number of times a particular component has been replaced. A component replacing a never-before-replaced component is assigned a replacement generation value of 1. Likewise, a component replacing a once replaced component has a replacement generation value of 2, etc. The apparatus includes a plurality of tables for redundantly storing the latest replacement generation values for each component. Circuitry (or software) increments the replacement generation value assigned to a component identity that is replaced by a new component. The circuitry (or software) modifies the new component's label to indicate the incremented replacement generation value. The tables that store the replacement generation values are updated to indicate the incremented replacement generation value for the new component. When the system is subsequently started, the replacement generation values in each component's label are compared with the replacement generation values in the tables and wherever a match is not found, the component is rejected.

DETAILED DESCRIPTION OF THE INVENTION

A system incorporating the invention should include a number of components, which if they fail, may be removed from the system and replaced. The system should also include a set of spare components, each of which is capable of assuming the role of a failing operational component. The system includes a means for selecting a spare to replace a failing component and to cause its activation as a replacement. The replaceable component is assumed to be capable of storing and updating a small amount of information concerning its status.

Figures 1, 2, 3:
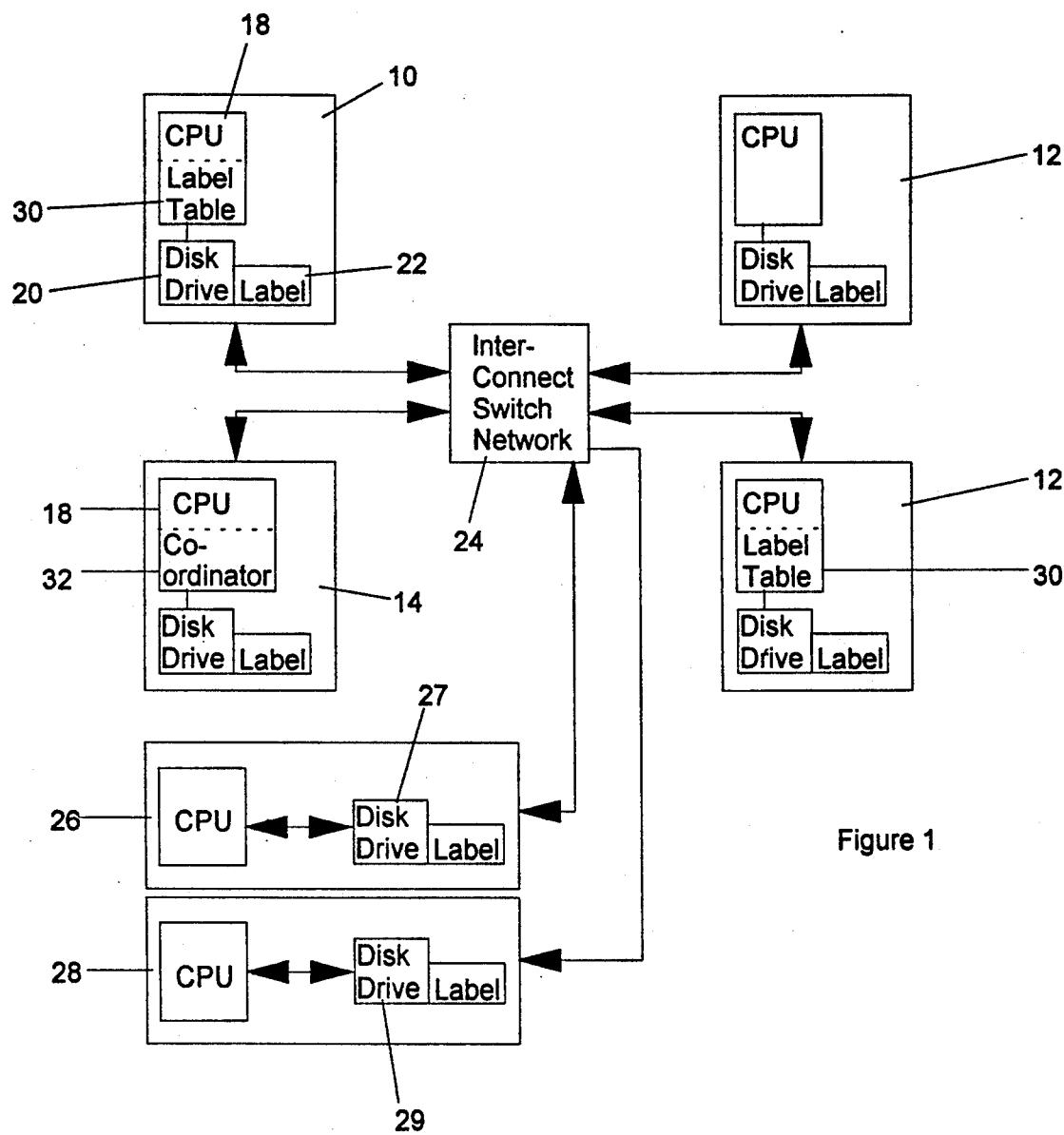
FIG. 1 is a high level block diagram of a fault-tolerant data processing system that incorporates the invention.
FIG. 2 is a schematic diagram showing a component label.
FIG. 3 is a schematic diagram showing a generation table that is stored at various points in the system of FIG. 1.

Referring now to FIG. 1, a parallel processing system is shown including a plurality of nodes 10, 12, 14 and 16. Each node includes a central processing unit 18 and a disk drive 20, with each disk drive having incorporated therein a "label" which is schematically indicated at 22. Nodes 10, 12, 14 and 16 communicate through an interconnect switch network 24 which, in turn, communicates with a plurality of spare nodes 26, 28, that include disk drives 27 and 29, respectively.

Each disk drive 20, including those on spare nodes 26 and 28), is required to maintain and occasionally update certain information which is known as its "component label". The purpose of the label is to identify the component and its role in the system. An exemplary component label is shown in FIG. 2 and may include three entries, i.e., a system identifier, a component identifier and a generation value. The system identifier is a number chosen to be different from that assigned to any other system. It makes possible the identification of components which are erroneously inserted into a wrong system. All components, including spares which are intended for use in the same system, carry identical system identifiers.

A component identifier is a number which uniquely identifies each operational component in the system. Spares are indicated by another identifier chosen to be different from that used for operational components (for instance, a negative value). Typically, operational components are numbered sequentially from 0 through $N-1$ for a system including N operational components.

The generation value indicates the number of times that the component has been replaced In a brand new system, all components have a generation value of 0. If a component fails, then the generation number of the replacement component is set to 1 greater than the generation value of the failed component.

Nodes 10 and 16, are each provided with a label table 30 which may be stored on the respectively associated disk drives or on some other apparatus in the node. Each label table 30 contains the correct component label for each operational component in the system. No entries are included for spare components. An exemplary label table is shown in FIG. 3 and includes both the component identifier and generation value for each operational component. If components are numbered sequentially, then the component identifier can be eliminated, with each line of label table 30 corresponding to a like numbered component identifier value. A plurality of label tables 30 are distributed throughout the system of FIG. 1 so as to assure that at least one (or more) label tables will survive in the event of a malfunction of a node or nodes. Label tables 30 may be stored as part of the "personality" of the components or they may be stored externally to the system.

In node 14, CPU 18 is provided with a coordinator function routine 32 which implements a label checking function for the invention. While shown entirely within node 14, coordinator function 32 may also be distributed amongst a number of nodes.

Figure 5:
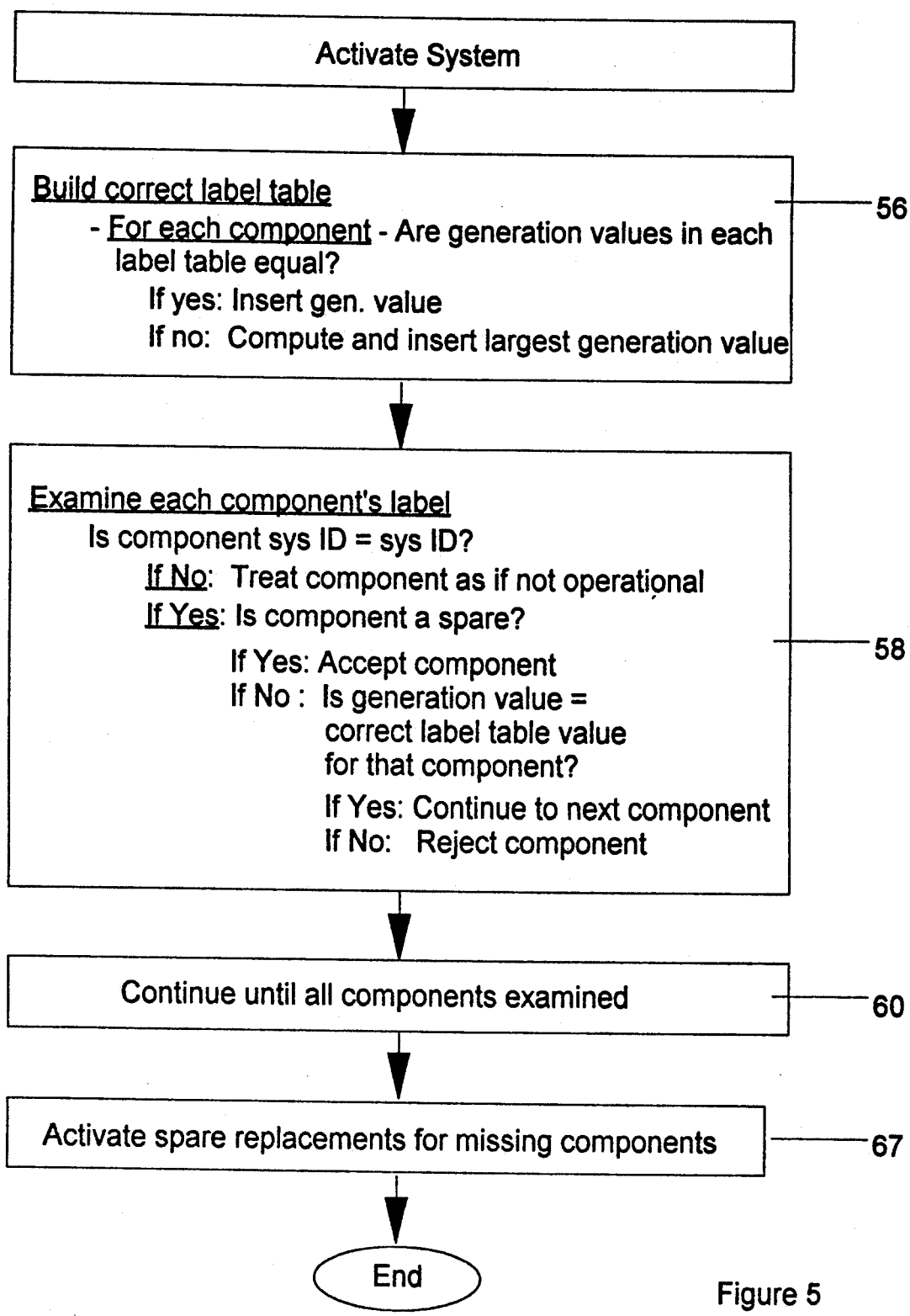
FIG. 5 is a flow diagram indicating actions which occur when a system is activated.
Figure 6:
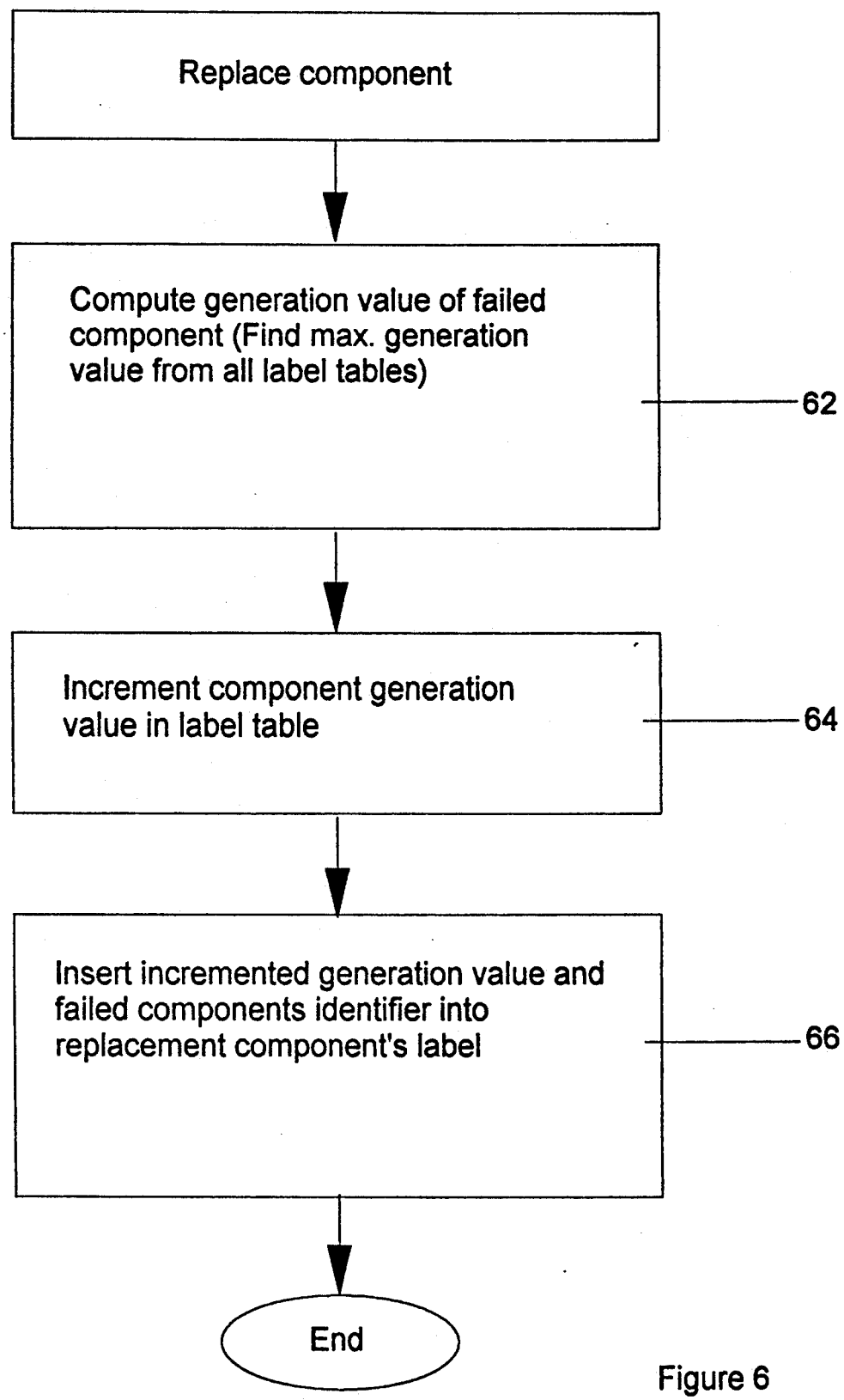
FIG. 6 is a flow diagram indicating actions which occur when a component is replaced.

Prior to describing the flow diagrams of FIGS. 4-6, an overview of the invention's operation will be given. The component label for each component is initialized during installation of a new system. Each component is assigned a common unique system identifier, and each operational component is given a sequential component identifier and a generation number of 0. Spare components are given an appropriate spare component identifier (for example, a negative value).

When a component fails, the spare component selected as a replacement has its component label updated. Its system identifier remains unchanged, but its component identifier is made equal to that of the failed component. The generation number for the replacement component is set to one greater than the generation number of the failed component.

The label tables within the system are also initialized when the system is first installed, and are updated whenever the system configuration is changed. For a brand new system, all generation values in the label table are typically set to 0.

Prior to activation of a replacement component, the entry in each accessible label table for the failed component must be updated to reflect a new generation value of the replacement component (recalling that the replacement component assumes the component identifier of the failed component).

Label table entries are incremented just before the new component label is written on the replacement component. This insures that the label table entry is always greater than or equal to the highest generation number ever used for a given component identifier. As above indicated, label tables are preferably stored in a distributed manner on the system components being managed. High reliability is thereby obtained by storing a copy of the label table on each of several of the system components. If a system failure occurs during the time that label tables are being updated, with some label tables being updated and others not, the system must assure that the highest generation value is the one used to update the component label for the replacement component. This is accomplished by surveying the entries for the component being replaced. The largest generation value found, of all those stored in the various label tables within the system, is then used to update the system's label tables.

Labels are checked whenever new components are inserted into a system, and also whenever a system is restarted, to account for the possibility that component may have been switched while the system was turned off. The checking function is performed by the CPU(s) which contain(s) the coordinator function (e.g. node 14 and CPU 18). When the system starts, coordinator function 32 compares all available label tables. Any differences reflect updates which could not be made as the system was stopping. The coordinator selects the highest generation number for each component and puts that value in the corresponding entry in each table. The coordinator then checks the label on each system component against corresponding entries in the label tables and against the expected system identifier. Any component with a non-matching system identifier is immediately rejected. If the generation value for any particular component matches the generation value in the label tables, then the component is known to be acceptable. If the component carries a generation value which is less than the entry in a label table, the component is known to have failed at some time in the past and it is automatically rejected. Should the coordinator function detect that there is no component with a correct indicated generation value, it will designate a replacement for the rejected component. The replacement is assigned a generation one higher than the corresponding entry in the label tables and the label tables are updated accordingly.

When a new component is inserted into an operational system, its system identifier is compared to the system's identifier. The component is immediately rejected if its system identifier fails to match that of the system. If the new component is marked as a spare, it is added to the spare pool without further checking Typically, operational components are not re-inserted into a running system intentionally since any such components are immediately replaced by a spare at the time of the component's removal Such components, once properly tested and reconditioned may be again labeled as spares and added to the spare pool.

In systems where replacement of removed components is not immediate, the label of the re-inserted component is checked against the label table, as above described. If the system identifier and generation value match the label table entries for the specific component, the reinserted component is known to be correct and is accepted into the operational system. Any mismatch indicates the component either belongs in a different system or was replaced by a spare after its removal. In either of these cases, the component is rejected. Whenever a component fails that is also storing a label table, a new table is created on that component's replacement.

Figure 4:
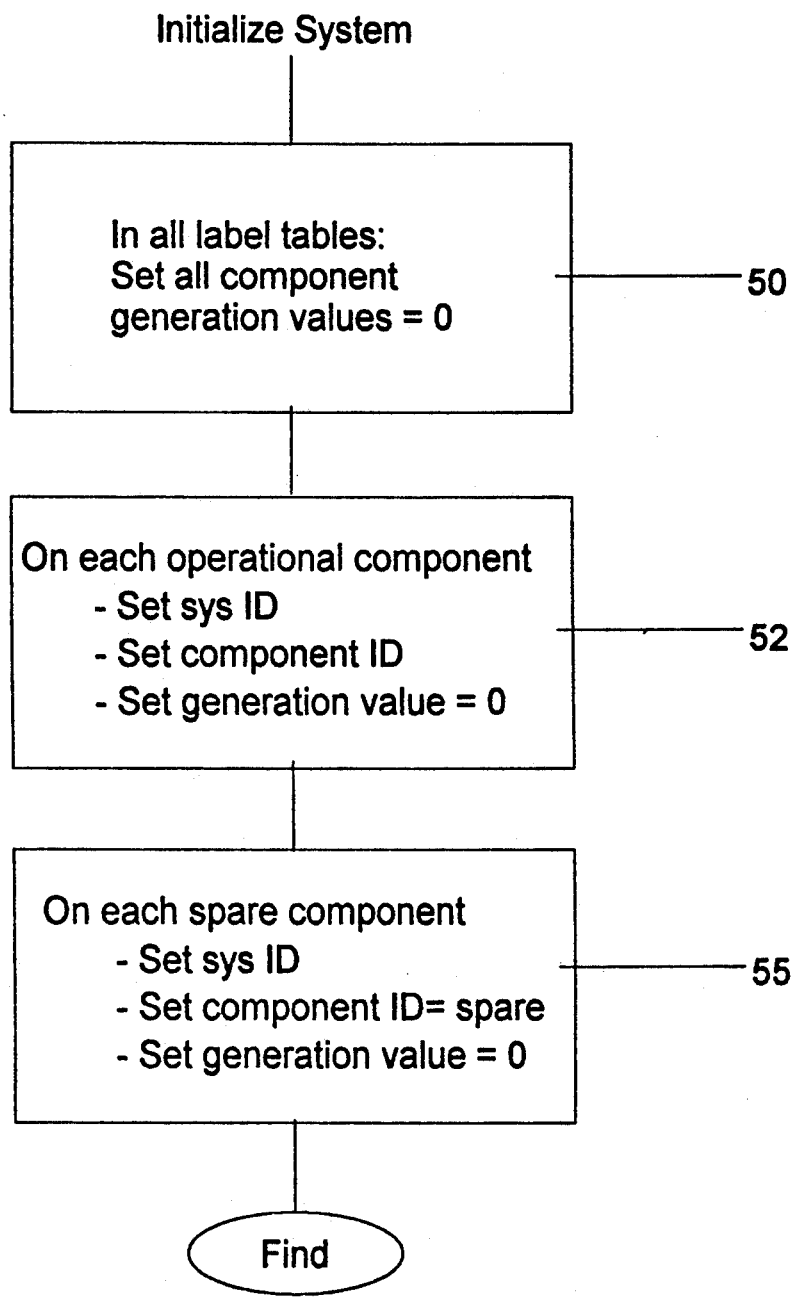
FIG. 4 is a flow diagram indicating the initialization process for a new system.

Turning now to FIG. 4, a new system is initialized by creating a plurality of label tables and in each, setting all component generation values equal to 0 (box 50). Each operational component then has its label values initialized (box 52). The initialization involves insertion of the proper system identifier; insertion of the component's identifier, and the setting of the generation value equal to 0. For each spare component, its component label is similarly initialized. Its system identifier is established; its component identifier value is set to indicate that it is a spare unit; and its generation value is set to 0.

When the system is activated (or re-activated) the coordinator function initially assembles a correct label table (box 56). Thus, for each component identifier listed in the system's label tables, it compares all generation values for the component in all label tables to determine if they are all equal. If they are all equal, the generation value is inserted as the value in the "correct" label table. If they are found to be unequal, then the largest generation value is computed from the accessed label tables and it is inserted into the "correct" label table. Such a disparity in generation values can occur if a system malfunction occurs during the time when the individual label table entries are being updated after a component replacement. The procedure shown in box 56 assures that only the largest generation value is employed in subsequent operations of the invention. Any tables found to be out of date are corrected by storing the correct label table over the old one.

The coordinator function then continues by examining each component's label in the system (box 58). During this examination, it is determined whether the component's system identifier matches the system's identifier and if not, the component is treated as if it is not operational. If a match is found, then it is known that the component is intended for the particular system. Then it is determined if the component is a spare and, if so, the component is accepted and placed into the spare pool.

If the component is not a spare, then it is an operational component and its generation value is matched to the generation value for that component in the "correct" label table. If a match is found, the procedure continues to the next component. If a match is not found, the component is rejected from the system. This latter comparison action prevents a previously inoperative component that has, for some reason become operative again, from inserting itself back into the system's operational component inventory. By definition, its generation value will be at least one less than the generation value of a replacement component. The procedure continues until all components have been examined (box 60), at which point replacements are activated for any missing components (box 67), the system is ready to operate, and subsequently, to handle a malfunctioning component. That procedure is shown in FIG. 6.

Upon the failure of a component, the generation value is computed for the failed component (box 62). Since the failed component may not be able to provide to the coordinator function its component label, the computed generation value is derived by finding the maximum generation value from all label table entries for the particular failed component. That computed generation value is then incremented (box 64) and the incremented value is reinserted in each accessible label table at the position corresponding to the component identifier being replaced. Then, the incremented generation value is inserted into the component label of the replacement component (along with the component identifier of the failed component) (box 66) at which point, the procedure is at an end.

It should be understood that the foregoing description is only illustrative of the invention. For instance, while the above description has indicated that it is nodes which are being replaced in the network shown in FIG. 1, any replaceable component within the system could be the replaceable unit (e.g. disk drives). In addition, alternate representations are contemplated for information in the label tables. Various alternatives and modifications can be devised by those skilled in the art without departing from the invention. Accordingly, the present invention is intended to embrace all such alternatives, modifications and variances which fall within the scope of the appended claims.

We claim:

1. Apparatus for component replacement control in a data processing system, each component assigned a label including a component identifier and a replacement generation value, said apparatus comprising:
   table means for storing replacement generation values for each said component;
   means for incrementing a replacement generation value assigned to a component that is replaced by a new component, and modifying said new component's label to indicate said incremented replacement generation value and said replaced component's component identifier; and
   means for updating said table means to indicate said incremented replacement generation value for said component.

2. The apparatus as recited in claim 1 further comprising:
   means for matching the replacement generation value in each component's label with a replacement generation value derived for each said component from said table means, and for any component where a match is not found, providing a mismatch indication.

3. The apparatus as recited in claim 2, further comprising:
   means responsive to said mismatch indication to reject said component having said mismatching replacement generation value.

4. The apparatus as recited in claim 2 wherein said table means comprises:
   a plurality of tables distributed about said apparatus, each said table including replacement generation values for each component.

5. The apparatus as recited in claim 4, further comprising:
   coordinator means responsive to activation of said data processing system for matching the replacement generation values for each component in each said table and upon finding a mismatch for a component, modifying said table to indicate the greatest replacement generation value indicated for the component in said tables.

6. The apparatus as recited in claim 5, wherein said component label indicates a system identifier designating a system for which said component is to be utilized, and wherein said coordinator means is responsive to system activation to compare said system identifier in each component's component label with said system identifier to determine if a match is present, and if not, to reject said mismatched component.

7. The apparatus as recited in claim 1 wherein said table means are updated to indicate said incremented replacement generation value prior to said new component's label being modified to indicate said incremented replacement generation value.

8. The apparatus as recited in claim 1 wherein a said component comprises a memory system.

9. The apparatus as recited in claim 8 wherein said memory system comprises a disk drive.

10. The apparatus as recited in claim 9 wherein a said component includes a central processing unit in addition to said disk drive.

11. A method for component replacement control in a data processing system wherein each component is assigned a label including a component identifier and a replacement generation value, said method comprising the steps of:
    storing replacement generation values for each said component in a plurality of tables;
    incrementing a replacement generation value for a new component that is substituted for a replaced component, said incremented replacement generation value being greater than the generation value assigned to the replaced component;
    assigning to the replacement component the identity of the replaced component; and
    updating the tables to indicate the incremented replacement generation value.

12. The method as recited in claim 11 further comprising the step of:
    modifying the new component's label to further indicate the incremented replacement generation value.

13. The method as recited in claim 12 further comprising the step of:
    matching the replacement generation value in each component's label with a replacement generation value derived for each component from the tables and providing a mismatch signal for any component where a match is not found.

14. The method as recited in claim 13 further comprising an initialization step of:
    matching replacement generation values, upon system activation, for each component in each said table, and upon finding a mismatch, modifying the tables to indicate the greatest replacement generation value indicated in the tables for a said component.

15. The method as recited in claim 14 wherein each said component label includes a system identifier designating a system in which said component is to be utilized and including the step:
    comparing the component label system identifier for each component with the system's identifier to determine if a match is present and, if not, de-enabling the component having a system identifier that does not match the system in which it is connected.

* * * * *